(12) United States Patent
Garcia et al.

(10) Patent No.: US 6,726,822 B2
(45) Date of Patent: Apr. 27, 2004

(54) ELECTRODEIONIZATION PROCESS

(75) Inventors: Benny Garcia, West Roxbury, MA (US); Andrew Proulx, Concord, MA (US)

(73) Assignee: Millipore Corporation, Bedford, MA (US)

( * ) Notice: Subject to any disclaimer, the term of this patent is extended or adjusted under 35 U.S.C. 154(b) by 263 days.

(21) Appl. No.: 10/059,573

(22) Filed: Jan. 29, 2002

(65) Prior Publication Data

US 2002/0092769 A1 Jul. 18, 2002

Related U.S. Application Data

(62) Division of application No. 09/616,137, filed on Jul. 13, 2000, now Pat. No. 6,391,178.

(51) Int. Cl.[7] .............................................. B01D 61/48
(52) U.S. Cl. ...................... 204/519; 204/524; 204/533; 204/536
(58) Field of Search ................................ 204/519, 524, 204/533, 536

(56) References Cited

U.S. PATENT DOCUMENTS

| | | | |
|---|---|---|---|
| 3,269,933 A | 8/1966 | Mahoney et al. | 204/301 |
| 3,585,518 A | 6/1971 | Hitt et al. | 330/10 |
| 5,308,466 A | 5/1994 | Ganzi et al. | 204/151 |
| 5,324,398 A | 6/1994 | Erickson et al. | 204/149 |
| 5,425,858 A | 6/1995 | Farmer | 204/149 |
| 5,762,774 A | 6/1998 | Tessier | 204/632 |
| 5,858,199 A | 1/1999 | Hanak | 205/687 |
| 5,948,304 A | 9/1999 | Bradenbaugh | 219/496 |
| 6,365,023 B1 * | 4/2002 | De Los Reyes et al. | 204/524 |
| 6,391,178 B1 * | 5/2002 | Garcia et al. | 204/628 |
| 6,607,668 B2 * | 8/2003 | Rela | 210/321.6 |

FOREIGN PATENT DOCUMENTS

| WO | 99/17864 | 4/1999 |
|---|---|---|

* cited by examiner

*Primary Examiner*—Arun S. Phasge
(74) *Attorney, Agent, or Firm*—Nields & Lemack

(57) ABSTRACT

An improved electrodeionization system for removing ions from liquids passed therethrough, comprising a flow-through electrodeionization module, and a power supply electrically connected to the electrodeionization module electrodes so as to establish a voltage gradient thereacross. The invention includes a monitoring device such as a resistivity sensor for monitoring the value of a property (e.g. resistivity) of the liquid output flow from the electrodeionization module, and a controller responsive to the monitoring device, for controlling the amount of time that the power supply is turned on, to maintain output quality within a predetermined range, while conserving power and simplifying power supply design.

7 Claims, 2 Drawing Sheets

ELECTRODEIONIZATION PROCESS

This application is a Divisional of U.S. patent application Ser. No. 09/616,137 filed on Jul. 13, 2000 now U.S. Pat. No. 6,397,178.

FIELD OF THE INVENTION

This invention relates to an improved electrodeionization system in which the power supply is pulsed on and off to maintain output resistivity in a predetermined range.

BACKGROUND OF THE INVENTION

Electrodeionization systems are used to remove ions from liquids, especially water. These systems require a power supply that applies voltage to the electrodeionization module. Typically, these power supplies are constant DC voltage power supplies, in which the current is varied to maintain a constant voltage. Another option is to use a constant DC current power supply, in which the voltage is varied as necessary to maintain a constant current.

The output liquid quality, measured in terms of resistivity, is in part dependent upon the input water quality, and in part dependent on the voltage applied to the electrodeionization module. Because of differences in the feed liquid ion composition and concentration, constant voltage power supplies need to be sized with a sufficient output current to handle feeds that have high ion concentration, especially water that contains high concentrations of weakly ionized species such as carbon dioxide and silica. Constant current power supplies suffer from the same drawback. Additionally, if the feed water has a lower ion concentration, especially of carbon dioxide or silica, such power supplies are often larger and more expensive than is needed to accomplish the result. Also in such cases, the electrodeionization module is continuously subjected to a higher voltage (or current) than necessary, which may contribute to poor performance as well as shortening the useful life of the module. Further, scaling of the electrodeionization module can be a problem when there is more current than necessary applied to the module.

SUMMARY OF THE INVENTION

It is therefore an object of this invention to provide an improved electrodeionization system that can use a more efficient power supply.

It is a further object of this invention to provide such a system that lowers power consumption, especially on low ion concentration feed waters in the order of 30–50%.

Is a further object of this invention to provide such a system that allows for a target range of output liquid resistivity.

It is a further object of this invention to provide such a system which may decrease scaling occurring in the electrodeionization module.

This invention results from the realization that a desired output water quality range can be realized in an electrodeionization system by pulsing the power supply on and off at a duty cycle proportional to the output water quality within the range. This allows the use of a simple, inexpensive constant current or constant voltage power supply, to achieve a tailored quality result.

This invention features an improved electrodeionization system for removing ions from liquids passed therethrough, comprising: a flow-through electrodeionization module; a power supply electrically connected to the electrodeionization module so as to establish a voltage gradient thereacross; first means for monitoring the value (e.g. resistivity) of a property of the liquid output flow from the electrodeionization module; and means, responsive to the first means for monitoring, for controlling the amount of time that the power supply is turned on.

The power supply may be a constant current or a constant voltage power supply. The system may also include second means for monitoring the value of the property of the liquid inlet flow to the electrodeionization module, and the means for controlling may be further responsive to the second means for monitoring.

The means for controlling may comprise a proportional band control means for controlling the amount of time that the power supply is on proportionally within a range of values of the measured property. The system may then further include means for establishing the range of values.

In another embodiment this invention features an improved electrodeionization system for removing ions from liquids passed therethrough, comprising: a flow-through electrodeionization module having a liquid inlet and a liquid outlet; a power supply electrically connected to the electrodes of the electrodeionization module so as to establish a voltage gradient thereacross; a resistivity monitor for monitoring the resistivity of the liquid output flow from the electrodeionization module; means for establishing a target resistivity range for the liquid output flow; and a proportional band control means, responsive to the resistivity monitor and the target resistivity range, for proportionally controlling the amount of time that the power supply is turned on such that the power supply is continuously on when the resistivity is below the range, and is continuously off when the resistivity is above the range, and is intermittently on when the resistivity is within the range.

The control means may establish a power supply cycle time. When the resistivity is within the target range, the control means may turn on the power supply for a portion of each cycle time that is inversely proportional to the monitored resistivity relative to the range.

BRIEF DESCRIPTION OF THE DRAWINGS

Other objects features and advantages will occur to those skilled in the art from the following description of the preferred embodiments, and the accompanying drawings, in which.

DESCRIPTION OF THE PREFERRED EMBODIMENTS

This invention may be accomplished in an improved electrodeionization system for removing ions from liquids passed therethrough. The system includes a flow-through electrodeionization module, with a power supply electrically connected to the module electrodes such as to establish a voltage gradient across the module as is known in the art. There is a first means, such as a resistivity monitor, for monitoring the value of a property (such as resistivity) of the liquid output flow from the electrodeionization module. The amount of time that the power supply is turned on is controlled by a controller that is responsive to the resistivity monitor. Preferably, the controller is a proportional band controller that determines the power supply "on" time in inverse proportion to the output resistivity value relative to a preset output value range.

Figure 1:
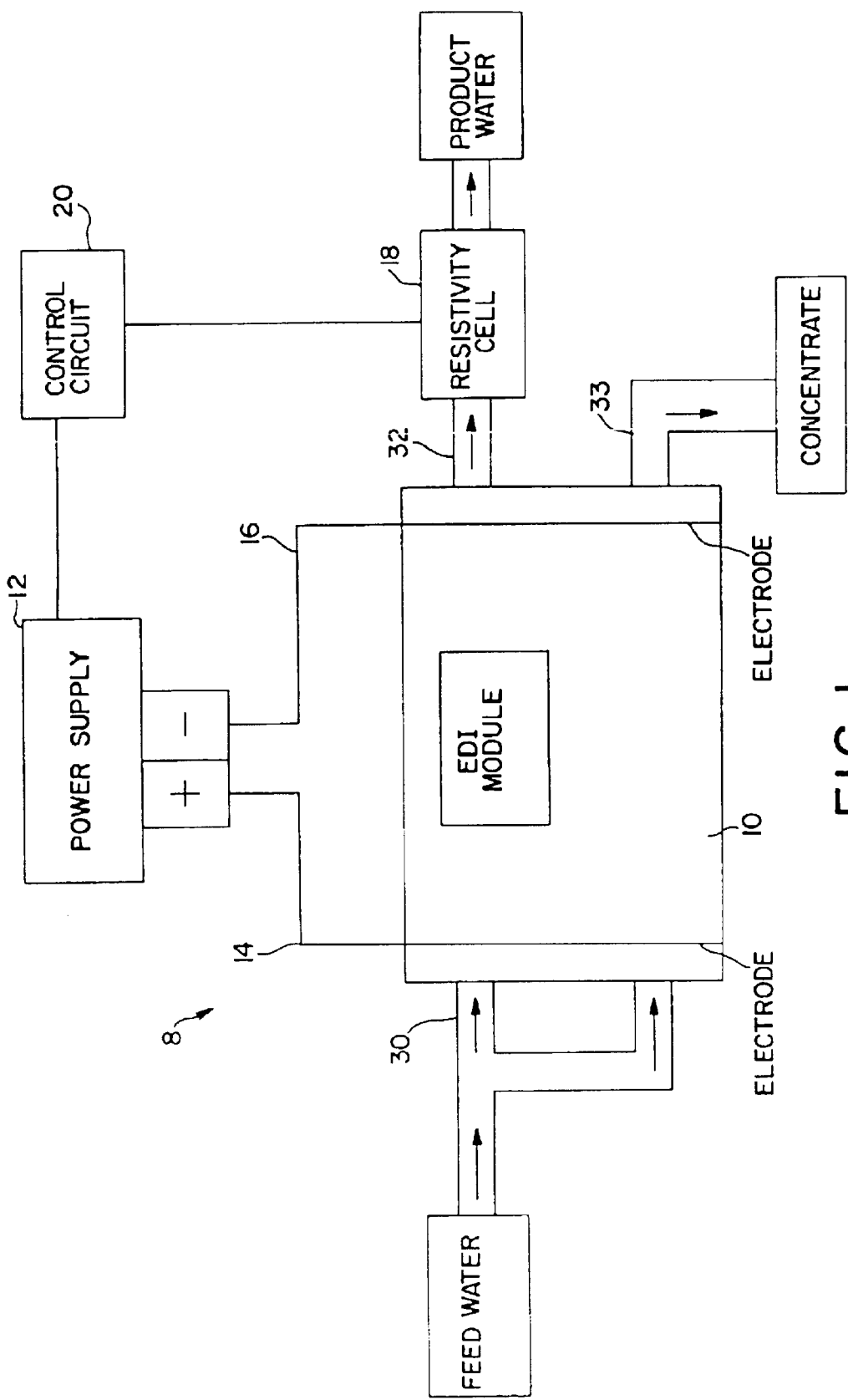
FIG. 1 is a schematic diagram of an embodiment of the improved electrodeionization system of this invention.

There is shown in FIG. 1 improved electrodeionization system 8 according to this invention. System 8 includes a flow-through the electrodeionization module 10 and a power supply 12 electrically connected to module 10 electrodes so as to establish a voltage gradient across module 10 in a manner known in the art. Power supply 12 may be a constant current or a constant voltage power supply, although a constant current power supply is preferred, as the output water quality is in part related to the current across the module 10. Preferably, the output current of power supply 12 can be set before each use of the system, dependent upon the input water quality and the output range desired. Feed water enters module 10 at liquid inlet 30, and clean water exits module 10 at output 32. The waste leaves module 10 at location 33.

This invention accomplishes on-off control of power supply 12 in order to provide a desired liquid output quality range. This result may be accomplished with the combination of a first means, (resistivity cell 18), for monitoring the value of a property of the liquid output flow from the electrodeionization module 10, and means (such as control circuit 20), responsive to resistivity cell 18, for controlling the amount of time that power supply 12 is turned on.

Preferably, control circuit 20 accomplishes a proportional band control means. Such a proportional band control means has a preset output resistivity range that can, if desired, be constant in the system, or settable by the operator. This control means proportionally controls the amount of time that power supply 12 is turned on, such that power supply 12 is continuously on when the resistivity is below the predetermined range, is continuously off when the resistivity is above this range, and is intermittently turned on and off in inverse proportion to the output flow liquid resistivity relative to the range when the resistivity is within the predetermined range.

Figure 2:
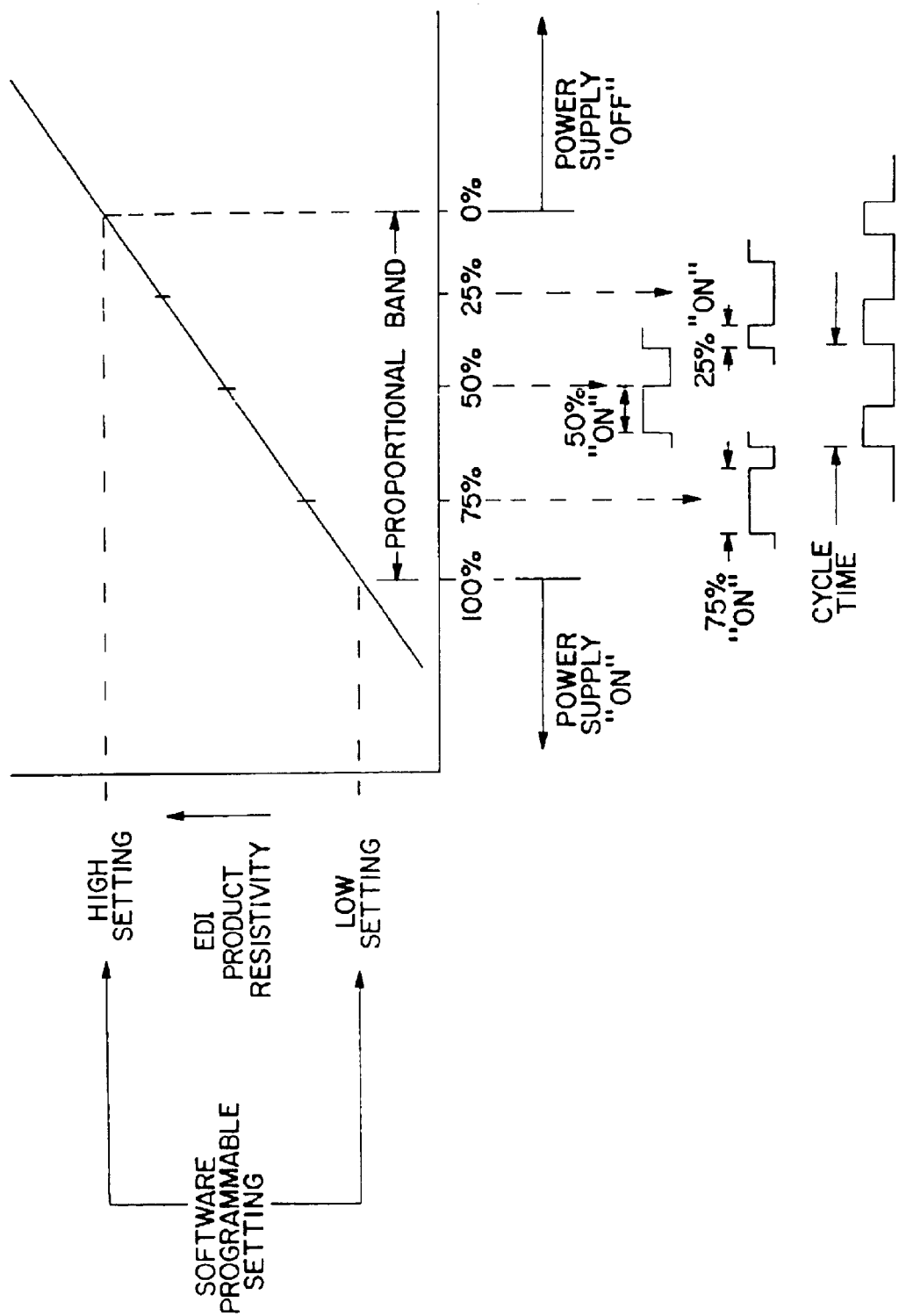
FIG. 2 illustrates conceptually the preferred proportional band power supply control for the invention.

The operation of a preferred embodiment of such a proportional band control scheme is illustrated in FIG. 2. The preset output resistivity range is the range between the low setting and high setting shown on the y axis. Preferably, the size of this range and its location along the possible resistivity value line, is preset by the operator through software program control. When the output resistivity is below the low setting as measured by resistivity cell 18, FIG. 1, the control circuit 20 enables power supply 12 to be continuously turned on. Conversely, when the resistivity is above the high end of the range, the power supply is continuously off. When the resistivity is within the proportional band, the power supply is turned on for a time that is inversely proportional to the output resistivity relative to the range. This proportional control is schematically illustrated in FIG. 2 for the values of 75 percent, 50 percent and 25 percent on time.

In the preferred embodiment, this proportional band control is accomplished as follows. The control circuit 20 includes a solid state relay or another switch that is capable of turning power supply 12 on and off. Control circuit 20 establishes a power supply cycle time, which may be, for example, 10 seconds. During each such 10 second cycle, control circuit 20 controls power supply duty cycle, or the amount of time that the power supply is turned on. For example, if the output resistivity is 25 percent above the low setting of the resistivity range, the power supply is turned on for 75 percent of each 10 second cycle. Conversely, if the output resistivity is 75 percent of the range above the low setting, the power supply is turned on for 25 percent of each cycle. This proportional band control maintains the output resistivity within the preset range while conserving power. When the power supply is off, the ion exchange resin continues to remove ions. The power boosts the ion transport rate and also regenerates the ion exchange resin. The control scheme allows the use of a relatively simple, inexpensive constant current or constant voltage power supply that does not need to be oversized to achieve a desired resistivity.

In situations in which the input water quality may vary, it can also be desirable to have a second measuring device, like a conductivity cell, not shown in the drawings, for measuring the conductivity of the input liquid feed to the electrodeionization module. In this situation, the proportional band control means may also be responsive to the conductivity cell. The conductivity sensor determines the input values of the liquid and then supplies that value to the controller. The controller compares the value with a predetermined minimum value and the present voltage and determines whether the system as set will be capable of producing liquid within the desired range. If not, the system will either inform the operator of this via a message or alarm and the operator can manually adjust the system to provide the necessary voltage to achieve that range, or it may with appropriate electronics automatically adjust the voltage to maintain the output liquid within the desired range. An option is to have the system periodically check the input and change the voltage to meet the needs presented by the current liquid supply. In this way one can have a constantly adjusting system which may be helpful in liquid supplies where the quality changes periodically, or it can be used to continuously adjust the power supply until it reaches the optimized level.

Although specific features of this invention are shown in some drawings and not others, this is for convenience only, as the features may be combined in manners known in the art and still fall within the scope of claims. Other embodiments will occur to those skilled in the art and are also within the scope of the following claims.

What is claimed is:

1. A method for removing ions from liquids passing through an electrodeoinization system, comprising:

provinding a flow-through electrodeionization module having spaced electrodes;

establishing a voltage gradient across said electrodes;

monitoring the value of a property of the liquid output from said electrodeionization module; and controlling the amount of time that said voltage gradient is applied across said electrodes in response to said monitoring.

2. The method of claim 1, wherein said property is resistivity.

3. The method of claim 1, further comprising monitoring the value of a property of the liquid input into said electrodeionization module, and wherein the amount of time that said voltage gradient is applied across the electrodes is responsive to said monitoring of said value of said property of said liquid input.

4. The method of claim 1, wherein said amount of time that said voltage gradient is applied across said electrodes is controlled by controlling the amount of time power is supplied to said electrodeionization module.

5. The method of claim 4, wherein the amount of time power is supplied to said electrodeionization module is proportionally controlled.

6. The method of claim 4, wherein the amount of time power is supplied to said electrodeionization module is proportionally controlled such that said power is continuously on when said monitored value is below a predetermined range, is continuously off when said monitored value is above said predetermined range, and is intermittently on when said monitored value is within said predetermined range.

7. The method of claim 6, wherein said monitored value is resistivity.

* * * * *